United States Patent
Pratte et al.

[11] Patent Number: 6,127,509
[45] Date of Patent: Oct. 3, 2000

[54] POLYIMIDES HAVING HIGH TG, HIGH TOS, AND LOW MOISTURE REGAIN

[75] Inventors: James F. Pratte; Murty S. Tanikella, both of Wilmington, Del.

[73] Assignees: E. I. du Pont de Nemours and Company, Wilmington, Del.; Fiberite Inc., Havre de Grace, Md.

[21] Appl. No.: 09/319,218

[22] PCT Filed: Dec. 4, 1997

[86] PCT No.: PCT/US97/23043

§ 371 Date: Jun. 1, 1999

§ 102(e) Date: Jun. 1, 1999

[87] PCT Pub. No.: WO98/24830

PCT Pub. Date: Jun. 11, 1998

Related U.S. Application Data

[60] Provisional application No. 60/031,583, Dec. 5, 1996, and provisional application No. 60/038,938, Feb. 24, 1997.

[51] Int. Cl.[7] .......................... C08G 73/10; C08G 69/28; B32B 27/00

[52] U.S. Cl. .......................... 528/170; 528/125; 528/128; 528/172; 528/173; 528/176; 528/183; 528/185; 528/188; 528/220; 528/229; 528/350; 528/353; 525/436; 525/928; 428/411.1; 428/473.5

[58] Field of Search ...................................... 528/170, 353, 528/125, 128, 172, 173, 176, 185, 188, 183, 220, 229, 350; 525/928, 436; 428/473.5, 411.1

[56] References Cited

U.S. PATENT DOCUMENTS

| | | | |
|---|---|---|---|
| 4,512,893 | 4/1985 | Makino et al. | 210/500.2 |
| 4,623,563 | 11/1986 | Noda et al. | 427/379 |
| 4,720,539 | 1/1988 | Rabilloud et al. | 528/353 |
| 4,731,287 | 3/1988 | Noda et al. | 428/332 |
| 4,797,307 | 1/1989 | Kunimoto et al. | 427/386 |
| 4,839,217 | 6/1989 | Tabata et al. | 428/156 |
| 5,077,382 | 12/1991 | Meterko et al. | 528/353 |
| 5,138,028 | 8/1992 | Paul et al. | 528/353 |
| 5,177,180 | 1/1993 | Griffin et al. | 528/353 |
| 5,243,024 | 9/1993 | Bockrath et al. | 528/353 |
| 5,264,545 | 11/1993 | Blum et al. | 528/353 |
| 5,300,620 | 4/1994 | Okikawa et al. | 528/172 |
| 5,304,626 | 4/1994 | Burgers et al. | 528/353 |
| 5,411,765 | 5/1995 | Kanakarajan et al. | 427/385.5 |
| 5,412,066 | 5/1995 | Hergenrother et al. | 528/353 |
| 5,464,927 | 11/1995 | Angelopoulos et al. | 528/350 |
| 5,478,913 | 12/1995 | Boyce et al. | 528/353 |
| 5,493,002 | 2/1996 | McGrath et al. | 528/310 |
| 5,830,564 | 11/1998 | Kohno et al. | 528/353 |

FOREIGN PATENT DOCUMENTS

| | | |
|---|---|---|
| 0210149 | 1/1987 | European Pat. Off. . |
| WO 95/17449 | 6/1995 | WIPO . |

OTHER PUBLICATIONS

PCT International Search Report, dated May 7, 1998.

R.J. Boyce & T.P. Gannett, "AVIMID®R A New High Temperature Polyimide Matrix Composite", *High Temple Workshop XV*, N, Jan. 1995.

Bessonov et al., "Polyimides: Thermally Stable Polymers", trans. ed. W.W. Wright, pp. 103–108 (Consultants Bureau), N.Y., N.Y. 1987.

*Primary Examiner*—P. Hampton-Hightower

[57] ABSTRACT

Polyimide polymers from 3,4,3',4'-biphenyltetracarboxylic dianhydride and 3,4,3',4'-benzophenonetetracarboxylic dianhydride and a diamine such as p-phenylenediamine exhibit a high glass transition temperature, high thermal oxidative stability and low moisture regain, useful for structural applications.

13 Claims, No Drawings

POLYIMIDES HAVING HIGH TG, HIGH TOS, AND LOW MOISTURE REGAIN

This application claims benefit of U.S. Provisional Application Serial No.60/031,583 filed Dec. 5, 1996 and U.S. Provisional Application Serial No. 60/038,938 filed Feb. 24, 1997.

FIELD OF THE INVENTION

The current invention relates to polyimide polymers characterized by high glass transition temperatures, high thermal oxidative stabilities, and low moisture regain. The current invention also relates to the process of making these polyimides and their use in applications such as composites, films, laminates, and other products.

BACKGROUND OF THE INVENTION

Polymers comprised of polyimides have been found to have a variety of desirable qualities that are useful in high temperature applications. In general, and particularly for use as matrix materials in structural composites, the desirable qualities include a high glass transition temperature (Tg), high thermal oxidative stability (TOS), low moisture regain, and low conversion costs. While polyimide polymers exhibiting one or some of these qualities are known, there is a need for polyimide polymers that have all of these advantages.

Known composite systems having desirable characteristics include systems designated as Avimid® K and Avimid® N (E.I. du Pont de Nemours and Co.).

Avimid® K, described in A. R. Wedgewood, SAMPE Tech. Conf. 24, p. T385, 1992, employs a matrix based on pyromellitic dianhydride and extended ether diamines. These polymers are compatible with composite molding processes featuring melt consolidation of devolatilized prepreg plies. The glass transition temperature range of the polyimide component of Avimid® K is in the range of from 220 to 255° C.

Avimid® N utilizes a polyimide polymer prepared from 2,2'-bis(3,4-dicarboxyphenyl)-hexafluoropropane tetracarboxylic acid (6FTA), the dianhydride form of which is referred to as 6FDA, along with a mix of p-phenylenediamine (PPD) and m-phenylenediamine (MPD). This polyimide polymer, designated and known in the art as NR-150, has a glass transition temperature range of about equal to or greater than 340° C., with a reported moisture regain of about 3.7% by weight. See R. J. Boyce and T. P. Gannett, HIGH TEMPLE WORKSHOP XV, N, January 1995.

Another known polyimide polymer is comprised of biphenyl dianhydride and optionally pyromellitic dianhydride (PMDA) with 1,4-bis(4-aminophenoxy)-2-phenylbenzene (2PhAPB144) and MPD or PPD. See U.S. Pat. No. 5,478, 913. This polymer exhibits a glass transition temperature range of about 220 to about 330° C., with a moisture regain reported in R. J. Boyce and T. P. Gannett, HIGH TEMPLE WORKSHOP XV, N, January 1995, of about 2.8%.

The current invention provides novel polyimides which have relatively high Tg and with thermal oxidative stability and moisture regain characteristics significantly better than those exhibited by 6FTA or 6FDA based resins. The polyimide polymers of the current invention have good mechanical properties, making them useful in a wide variety of applications. Moreover, the invention has the potential of cost savings over the polyimides of the state of the art because the acid functional components of the current invention are relatively less expensive than the acid functional components of known polyimide polymers.

SUMMARY OF THE INVENTION

The current invention provides novel polyimide polymers having a high glass transition temperature (Tg), high thermal oxidative stability (TOS), and very low moisture regain, comprising the following recurring structural units:

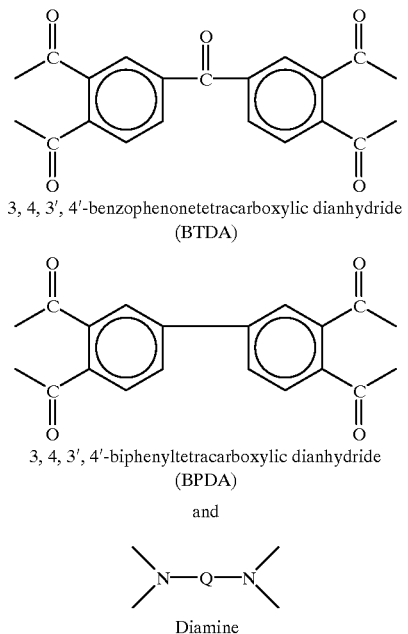

3, 4, 3', 4'-benzophenonetetracarboxylic dianhydride (BTDA)

3, 4, 3', 4'-biphenyltetracarboxylic dianhydride (BPDA)

and

Diamine wherein the mole ratio of BTDA to BPDA in the polymer is from more than about 30 to less than about 70 (>30:<70) to about 80 to 20 (80:20), and Q is a suitable aromatic moiety. Also provided by the current invention are such polyimides formed from a precursor solution having a stoichiometric excess of either the diamine or dianhydride (or derivatives thereof) components as a means of controlling the molecular weight of the polyimide polymers formed. Moreover, the current invention also includes the use of end-capping agents. The end-capping agents may be non-reactive, reactive (if, for example, cross-linking is desired), or a mixture of both.

In addition to the resulting polyimides themselves, the current invention also encompasses the resins which can be formed therefrom, and composites and prepregs reinforced with substrates. The substrates may be any of those known in the art, including but not limited to materials such as glass, carbon, metallic, and aramid fibers or particles. See, e.g., U.S. Pat. No. 5,138,028.

The invention likewise encompasses, but is not limited to, the use of the polyimides of the current invention in applications such as films and laminates.

DETAILED DESCRIPTION OF THE INVENTION

The polyimides of the current invention are prepared by reacting 3,4,3',4'-biphenyltetracarboxylic dianhydride (biphenyl dianhydride or BPDA) and 3,4,3',4'-benzophenone-tetracarboxylic dianhydride (BTDA) with a suitable diamine component, or a mixture of suitable diamine components, such as p-phenylenediamine (PPD)

and m-phenylenediamine (MPD). BTDA and BPDA are acid functional components of the polyimides of the current invention. Reference to BTDA, BPDA, or acid functional components is intended to include all of the functional equivalent forms thereof, that is, such reference includes but is not limited to the dianhydride, tetracarboxylic acid, ester, or diester-diacid forms, other common derivatives known in the art, or any mixtures thereof. The specific acid functional components of the current invention may be initially added as any of the forms or equivalents as defined. A reactive or non-reactive end-capping agent can be employed if desired, for example, as disclosed in U.S. Pat. No. 5,478,913.

Polymerization according to the current invention is accomplished by adding BPDA and BTDA in the appropriate ratios to a solution of N-methylpyrrolidone (NHP) and ethanol, forming the diethylester diacid, and then adding the diamine component.

The diamine or diamine mixture is chosen from the group comprising aromatic diamines, such as a mixture of p-phenylenediamine (PPD) and m-phenylenediamine (MPD), PPD alone, or other diamines chosen to enhance, or at least not adversely affect, the desired characteristics achieved by use of the disclosed ratio of BTDA to BPDA in the acid functional component of the polyimide. The desired polyimide of the current invention is formed by the subsequent heating, and removal of the volatiles. The resulting material can be ground and formed into a desired shape under heat and pressure. The precursor solution can also be used to form composites by impregnating a fibrous reinforcing substrate with the precursor solution, or to form other structures by mixing the precursor solution with other types of substrates. In the case of using fibrous substrates for the creation of composites, the impregnated substrate is heated to form the polyimide, and the resulting material can then be shaped using heat and pressure.

Contrary to what might be expected from the nature of the components of the precursor solution, the resulting polyimides of the current invention exhibit excellent Tg, TOS, and moisture regain characteristics when compared to previously known polyimides, and are formed of readily available, economical ingredients.

The mixture of the acid functional components of the resulting polyimides of the current invention should be such that the mole ratio of BTDA to BPDA is within a defined range. The BTDA/BPDA mixture, whether comprising the entirety of the acid functional component or a major portion of the acid functional component of the polyimides, should be comprised of a mixture wherein the amount of BTDA should be higher than about 30 mole percent of the BTDA/BPDA mixture, up to about 80 mole percent of BTDA, while the amount of BPDA should be in the range of from less than about 70 mole percent to about 20 mole percent. Excellent results are achieved where BTDA constitutes about 70 mole percent of the BTDA/BPDA mixture. It is within the scope of the current invention to add minor amounts of other acid functional components to the mixture of BTDA and BPDA, so long as the ratios of BTDA to BPDA measured with respect to each other are as disclosed herein. For example, addition of minor amounts of other acid functional groups may be desired to maximize other characteristics of the resulting polyimide polymer, but the addition of the acid functional component or components other than BTDA and BPDA must be limited such that the concentration of the added acid functional components does not adversely affect the Tg, TOS, and moisture regain characteristics exhibited by polyimides made as disclosed herein.

The current invention can be characterized as being a polyimide having a glass transition temperature greater than about 300 degrees Centigrade comprising structural units derived from 3,4,3',4'-benzophenonetetracarboxylic dianhydride (BTDA), 3,4,3',4'-biphenyltetracarboxylic dianhydride, and one or more aromatic diamines wherein the mole ratio of the structural units derived from BTDA to the structural units derived from BPDA is more than about 3/7 up to about 4.0. A more preferred form of the polyimide polymer is the polymer wherein BTDA comprises from about 60 to about 80 mole percent of the BTDA/BPDA acid functional component, with the amount of BPDA ranging from about 20 to about 40 mole percent of the BTDA/BPDA component. In the most preferred form, the ratio of BTDA to BPDA is about 70 mole percent BTDA to about 30 mole percent BPDA. A preferred diamine component for forming the polyimides of the current invention is comprised of PPD in the range of from about 95 to 100 mole percent of the diamine component, and MPD in the range of up to about 5 mole percent of the diamine component, with a preferred ratio of about 95 mole percent PPD and about 5 mole percent MPD. In its most preferred form, the resulting polyimide will have a Tg of about 338° C., a thermal oxidative stability in terms of percent weight loss of about 4.3 percent, and a moisture regain characteristic in terms of percent weight gain of about 1.1 percent, all these characteristics determined and measured as described herein.

The diamine component used in forming polyimides of the current invention is chosen from the group comprising aromatic diamines or other diamines chosen to enhance, or at least not adversely affect, the desired characteristics achieved by use of the disclosed ratio of BTDA to BPDA in the acid functional component of the polyimide. A suitable diamine component for use in forming the polyimide polymers of the current invention is a mixture of p-phenylenediamine (PPD) and m-phenylenediamine (MPD). When this mixture of diamine components is used to form the polyimides, the diamine mixture should be such that PPD constitutes from about 95 to 100 mole percent of the diamine component, with MPD constituting from about 0 to 5 mole percent. Another suitable diamine component, used alone or as part of a mixture, is 1,4-bis(4-aminophenoxy)-2-phenylbenzene (2PhAPB144). As with the acid functional components, the functional equivalents of the diamines may be used, as is known in the art. The specific diamines chosen as the diamine components of the polyimides of the current invention should be chosen so as to enhance, or at least not adversely affect, the desired Tg, TOS, and moisture regain characteristics achieved by use of the disclosed BTDA/BPDA ratios.

Either the diamine mixture or the acid functional mixture may be added in amounts calculated to provide slight stoichiometric excess over the other component. Generally, the excess is chosen to be not more than about 40 mole percent more than the amount of the acid or diamine component needed for an equimolar reaction of acid and diamine.

End-capping agents can be used as is known in the art to control characteristics of the polyimide such as the molecular weight of the resulting polyimide polymers, to provide cross-linking capability, or both. Either reactive or non-reactive end-capping agents, or a selected mixture of both, may be used. Phthalic anhydride or phenyl amine, for example, can be used as non-reactive end-capping agents. Suitable reactive end-capping agents include, for example, phenylethynylaniline (PEA) and phenylethynyl phthalic anhydride (PEPA). The use of a reactive end-capping agent enables cross-linking to take place when the polyimide is heated during the curing process. The end-capping agents, whether reactive or non-reactive, can be introduced with either the diamine or acid functional components.

Tests and Measurements

The glass transition temperatures (Tg) of the resins in the following examples were determined by forming a resin plaque, that is, a plaque made of only the polyimide polymer, of the resin to be tested. A Dynamic Mechanical Analysis (DMA) was performed by plotting storage modulus values against temperature. Tangents to the curve before and after the inflection point were drawn and the temperature value of the intersection of these tangents was used as the Tg value. Measurements were taken using a TA Instruments 9900 system with a heat-up rate of 10° C. per minute in air with a maximum temperature of 500° C.

Thermal oxidative stability (TOS) values for the resins in the following examples were determined as follows. Resins were formed into 3"×6" (0.176 m×0.152 m) resin plaques. Coupons measuring 1"×1" (0.025 m×0.025 m) were cut from the plaques and dried at 120° C. for sixteen hours. The dry weight of the coupons was measured. The coupons were then exposed to flowing air at 750° F. (399° C.) for one hundred hours in a Grieve Class "A" oven. The weight of the samples was then determined and weight losses were calculated in weight percent. Samples were usually run in duplicates from which average values were calculated.

Moisture regain for the resins in the examples were measured as follows. coupons of resin plaques were prepared as described above for the TOS measurements. Duplicate coupons were placed in a humidity chamber maintained at 60° C. and 95% relative humidity (R.H.). Weight gains as weight percent were measured on a regular time basis until saturation was achieved. The humidity chamber used was a Blue M Humid-Flow combination temperature and humidity cabinet.

EXAMPLES

Preparation of Polyimide Solution

Various polyimides were prepared in accordance with the current invention. All of the polyimides of the current invention were made in the same general way, with additional polyimides being prepared to illustrate and compare the characteristics of the polyimides made in accordance with the current invention. The relative proportions of the BTDA and BPDA were varied to produce polyimides from precursor solutions in which the ratio of BTDA was varied in increments of from about 20 to about 80 mole percent with respect to the proportion of BPDA, while the amount of BPDA used was accordingly varied in increments of from about 20 to about 80 mole percent with respect to the proportion of BTDA. All of the examples shown here were made with the diamine component comprising a mixture of about 95 mole percent PPD and about 5 mole percent MPD. For comparison purposes, a sample of NR-150 resin was prepared by the method described herein. This resin was prepared using 100 mole percent of 6FTA as the acid functional or dianhydride component, while the diamine component was the same mixture (PPD:MPD: : 95:5) used in preparation of the polyimides of the current invention. The particular amounts used are set forth in the tables.

The samples were prepared as follows. A glass reaction vessel, for example, a 500 ml. 4-necked round bottomed flask, was fitted with a water condenser having an $N_2$ purge set-up at the top. An agitator and a thermocouple were fitted to the vessel also. The vessel was thoroughly purged with nitrogen. To the vessel were added 128 grams of N-methylpyrrolidone (NMP) and 128 grams of anhydrous ethanol (E). This solvent mixture was then heated to 30° C. BTDA and BPDA as either the dianhydrides or diacids were added, and the solution was agitated while the solution was raised to a temperature of 90+/−2° C. and held for two hours to effect complete dissolution. With continuing agitation, the solution was then cooled to 75+/−2° C. The diamine components were then added to the vessel, and this solution was held for 1.5 hours with continued agitation. The solution thus formed was then transferred to a container and stored until needed. In this form, the solution is known in the art as a precursor or binder solution. It may be used to impregnate various substrates, such as fibers, to form prepregs, or may be further processed as in its pure, or neat, form for other uses.

Isolation of Polyimide Neat Resin Powder

The polyimide resins used in the plaques and coupons from which the data in the tables were derived were prepared as follows. Approximately 100 grams of the sample solution prepared as described above was placed into a 2" deep aluminum pan. The pan with the solution was then placed into a vacuum oven, which was maintained at a temperature of 110° C. and a pressure of 10" (0.25m) Hg. A dry nitrogen bleed was maintained throughout the entire process. The sample was held at 110° C. for about one hour or until the flow of volatilized solvent to the oven's condenser had substantially stopped. The oven temperature was then raised to 200° C. and held there for one hour.

The resulting partially devolatilized and partially cured material was then removed from the oven, cooled in a dessicator, and then ground in a Waring type blender. The resulting powder was then placed in an aluminum pan, and heated in a Class A oven and held at 330° C. (625° F.) for two hours. The material was then removed from the oven, cooled in a dessicator, and ground into a fine powder. The powder was placed in an airtight container for storing.

Formation of Resin Plaques

The neat resin plaques from which the sample coupons were cut were formed by utilizing a compression press. The press was preheated to 490° C. A mold measuring 3"×6" (0.176 m×0.152 m) was placed on the press platen, and 60 grams of the selected resin powder was placed in the mold and held with minimal pressure. When the temperature of the mold in the press reached 430° C., the pressure on the mold was gradually increased over a period of two minutes to a final pressure of 3,300 pounds per square inch (224.55 atm.) and then held at this value. When the temperature of the mold reached 480° C., the press was allowed to cool to about 300° C. After cooling, the pressure was released, the mold was removed from the press, and the neat resin plaque was removed from the mold and subjected to the tests as described above.

Table 1 shows the components used in the foregoing procedures for preparing a precursor solution in which the ratio of BTDA to BPDA was 70 to 30. In this example, the acid functional component was comprised of only BTDA and BPDA, and the ratio was therefore 70 mole percent BTDA and 30 percent BPDA. This acid functional component was mixed with a diamine solution of 95 mole percent PPD and 5 mole percent MPD in the NMP and ethanol solvent. The table shows the ingredients, the molar amounts of BTDA, BPDA, PPD, and MPD used, and the respective weights in grams of all the ingredients used to produce the precursor solution.

Table 2 sets forth the mole percent amounts and equivalent weights used in preparing samples in which the ratio of BTDA was varied from about 20 to about 80, and the corresponding ratio of BPDA was varied respectively from about 80 to about 20. For these samples, BTDA and BPDA comprised the acid functional component, so that the ratios are shown as mole percent ratios. The table also shows the use of 100 mole percent and the equivalent weight of 6FTA used to prepare the resin designated as NR-150 used for comparison. For each mixture shown in Table 2, the amounts of NMP, ethanol, PPD, and MPD were the same as are set forth in Table 1 for the samples prepared, the PPD/MPD diamine component mix thus being in the ratio of PPD-:MPD: :95:5.

Table 3 sets forth the characteristics measured for the polyimide polymers made from each sample mixture shown in Table 2, including the comparative sample of NR-150 prepared. For each sample, the density of the polyimide is provided in grams per cubic centimeter (Density, gms/cc) and the glass transition temperature as measured by Dynamic Mechanical analysis is given in degrees Centigrade (Tg° C). The thermal oxidative stability (TOS) for the samples and the standard is given in the table as the percent weight loss determined as set forth above, that is after 100 hours in air at 750° F. (399° C.). It should be noted that, measured in this way, higher thermal oxidative stability is shown by a lower percent weight loss. The moisture regain values in Table 3 (Moisture Regain) were also measured as set forth above, that is, as percent weight gain after 31 days at 60° C. and 95% relative humidity. The values for Moisture Regain are in percent weight gain. It should be noted with respect to the data given in Table 3 that the NR-150 was cured under the same conditions as the samples made from the BTDA and BPDA mixes to normalize conditions.

Table 3 amply illustrates the advantages of the polyimides of the current invention over those known in the art. The respective glass transition temperatures of the resins, particularly those made with BTDA/BPDA ratios ranging from about BTDA:BPDA: :40:60 to about 80:20 compare favorably with the Tg shown for NR-150. Thus these resins, particularly the 70:30 resin, can be advantageously used in making composites for high temperature applications. The TOS of each sample, measured by percent weight loss, is greater in each instance than that of NR-150, that is, the percent weight losses of the samples of the current invention are lower than the percent weight loss measured for NR-150, and the TOS of the 70:30 resin is significantly better than that of the NR-150 TOS, the disclosed 70:30 suffering a weight loss of only 4.3% compared to the weight loss for NR-150 of 10.7%. Moreover, the measured moisture regain, measured as percent weight gain at saturation, for each sample resin is better than that for NR-150, the 70:30 resin again showing a moisture regain value of less than half of the NR-150 control.

The novel polyimides made in accordance with the current invention show superior TOS and moisture regain characteristics, while at the same time having Tg characteristics which make them useful in a wide variety of applications.

The characteristics of the polyimides of the current invention are unexpected. Those of ordinary skill in this art, considering the compounds 6FTA, BPDA, and BTDA used as acid functional components in polyimides, would generally expect that as the ratio of BTDA present is increased in polyimides, the resulting polyimide would exhibit lower thermal oxidative stability and a higher moisture regain characteristic. It has been reported, for example, that the thermal oxidative stability of BPDA should be greater than that of BTDA. See Bessonov et al., *Polyimides: Thermally Stable Polymers*, trans. ed. W. W. Wright, pp. 103–108 (Consultants Bureau, N.Y., N.Y. 1987). It is also unexpected that a polyimide made using BTDA and BPDA as the acid functional components would have better TOS and moisture regain characteristics than those exhibited by NR-150. Contrary to these expectations, as shown by the polyimides of the current invention, there is a range in which increasing the ratio of BTDA to BPDA in the acid functional component results in a polyimide having superior values for the moisture regain and thermal oxidative stability characteristics.

The components used in making the disclosed polyimides are readily available and economical. This, and the desirable characteristics of the polyimides of the current invention as shown herein, will make use of these polyimides advantageous in a number of applications. The high Tg and TOS characteristics provide excellent mechanical properties, making the polyimides of the current invention useful in applications requiring resin alone or as a component of composite structures. These and the other properties also make use of the resins of the current invention advantageous in the form of reinforced or unreinforced films and laminates. Products made utilizing the resins of the current invention are expected to have a relatively long life in applications where exposure to water is expected because of the low moisture regain characteristics as compared to other polyimides having relatively higher moisture regain properties.

The polyimides of the current invention may also be advantageously used as the resin matrices for composites. The high Tg should enable use in high-temperature applications such as machine or engine parts, and the TOS and moisture regain properties should contribute to providing a longer life-span for such composites. The substrates for which the resins of the current invention can be used as the polymer matrix can be any of those known in the art, including but not limited to fibrous substrates, metals, carbon or glass fibers or particles, and aramid fibers.

TABLE 1

RECIPE FOR 70/30 MOLE % BTDA/BPDA AND 95/5 MOLE % PPD/MPD POLYIMIDE SOLUTION

| INGREDIENT | MOLES | GMS |
| --- | --- | --- |
| NMP | — | 128 |
| ETHANOL | — | 128 |
| BTDA | 0.369 | 118.8 |
| BPDA | 0.158 | 46.5 |
| PPD | 0.499 | 54.0 |
| MPD | 0.027 | 30 |

TABLE 2

RECIPE FOR BTDA/BPDA POLYIMIDE SOLUTIONS

| | Mole Percent | | Weight (gms) | |
| --- | --- | --- | --- | --- |
| Sample | BTDA | BPDA | BTDA | BPDA |
| 1 | 80 | 20 | 136.0 | 31.0 |
| 2 | 75 | 25 | 127.3 | 39.0 |
| 3 | 70 | 30 | 118.8 | 46.5 |
| 4 | 60 | 40 | 101.8 | 62.4 |
| 5 | 40 | 60 | 67.9 | 93.6 |
| 6 | 30 | 70 | 50.9 | 109.2 |
| 7 | 20 | 80 | 33.9 | 124.8 |
| Control (NR-150) | 100 (6FTA) | | 253 (6FTA) | |

Note: The amounts of NMP, ethanol, PPD, and MPD are the same as in Table 1.

TABLE 3

BTDA/BPDA POLYMERS AND THEIR PROPERTIES

| Sample | BTDA/BPDA RATIO | DENSITY Gms/cc | Tg °C. | TOS | Moisture Regain |
|---|---|---|---|---|---|
| 1 | 80/20 | 1.42 | 345 | 6.5 | 1.8 |
| 3 | 70/30 | 1.43 | 338 | 4.3 | 1.1 |
| 4 | 60/40 | 1.37 | 317 | — | 1.2 |
| 5 | 40/60 | 1.43 | 302 | 2.1 | 0.5 |
| 6 | 30/70 | 1.43 | 299 | 2.4 | 0.6 |
| 7 | 20/80 | 1.43 | 305 | 2.0 | 1.1 |
| Control (NR-150) | 100(6FTA) | 1.45 | 379 | 10.7 | 2.4 |

Note: The diamine component for all of the above was PPD:MPD::95:5 by mole percent

We claim:

1. A polyimide polymer having a glass transition temperature of greater than about 300 degrees Centigrade comprising structural units derived from 3,4,3',4'-benzophenonetetracarboxylic dianhydride, 3,4,3',4'-biphenyltetracarboxylic dianhydride and one or more aromatic diamines, wherein the mole ratio of the structural units derived from 3,4,3',4'-benzophenonetetracarboxylic dianhydride to the structural units derived from 3,4,3',4'-biphenyltetracarboxylic dianhydride is in the range of from more than about 3.0/7.0 and up to about 4.0/1.0.

2. A polyimide polymer according to claim 1 wherein the aromatic diamines are selected from the group comprising m-phenylenediamine, p-phenylenediamine, 1,4-bis(4-aminophenoxy)-2-phenylbenzene, and mixtures thereof.

3. A process of preparing a polyimide polymer having a glass transition temperature of greater than about 300 degrees Centigrade comprising:
   a. forming a precursor solution by preparing a solution of an acid functional component containing 3,4,3',4'-benzophenonetetracarboxylic dianhydride and 3,4,3',4'-biphenyltetracarboxylic dianhydride in a polar aprotic solvent to form the diethylester diacid forms of the dianhydrides, wherein the mole ratio of the structural units derived from 3,4,3',4'-benzophenonetetracarboxylic dianhydride to the structural units derived from 3,4,3',4'-biphenyltetracarboxylic dianhydride is in the range of from more than about 3.0/7.0 and up to about 4.0/1.0 and reacting with a diamine component containing one or more aromatic diamines and
   b. heating the precursor solution to devolatilize and polymerize the precursor solution to the polyimide.

4. The process of claim 3 wherein either the acid functional component or the diamine component contains an end capping agent and there is a stoichiometric excess of either component with respect to the other of up to about 40 mole percent.

5. A polyimide polymer according to claim 1, wherein the mole ratio of the structural units derived from 3,4,3',4'-benzophenonetetracarboxylic dianhydride to the structural units derived from 3,4,3',4'-biphenyltetracarboxylic dianhydride is in the range of from about 3.0/2.0 to 4.0/1.0.

6. A polyimide polymer according to claim 1, wherein the mole ratio of the structural units derived from 3,4,3',4'-benzophenonetetracarboxylic dianhydride to the structural units derived from 3,4,3',4'-biphenyltetracarboxylic dianhydride is about 7.0/3.0.

7. A composite comprising the polyimide polymer of claim 1 reinforced with a substrate.

8. A precursor composition for preparing a solution containing the polyimide polymer of claim 1 comprising as the acid functional component 3,4,3',4'-benzophenonetetracarboxylic dianhydride and 3,4,3',4'-biphenyltetracarboxylic dianhydride and as the diamine component aromatic diamines, wherein the mole ratio of the structural units derived from 3,4,3',4'-benzophenonetetracarboxylic dianhydride to the structural units derived from 3,4,3',4'-biphenyltetracarboxylic dianhydride is in the range of from more than about 3.0/7.0 and up to about 4.0/1.0.

9. A prepreg comprising a fibrous substrate impregnated with the precursor composition of claim 8.

10. A polyimide polymer comprising an acid functional component containing structural units derived from 3,4,3',4'-benzophenonetetracarboxylic dianhydride and 3,4,3',4'-biphenyltetracarboxlyic dianhydride wherein the mole ratio of the structural units derived from 3,4,3',4'-benzophenonetetracarboxylic dianhydride to the structural units derived from 3,4,3',4'-biphenyltetracarboxylic dianhydride is in the range of from more than about 3.0/7.0 and up to about 4.0/1.0; a diamine component containing one or more aromatic diamines; and an end capping agent.

11. A polyimide having a glass transition temperature of about 338 degrees Centigrade, a thermal oxidative stability of about 4.3 percent, and a moisture regain of about 1.1 percent comprising; an acid functional component of 70 mole percent 3,4,3',4'-benzophenonetetracarboxylic dianhydride and 30 mole percent 3,4,3',4'-biphenyltetracarboxylic dianhydride, and a diamine component of from about 95 to 100 mole percent p-phenylenediamine and from 0 to about 5 mole percent m-phenylenediammne.

12. A film comprising the polyimide polymer of claim 1.

13. A laminate comprising the polyimide polymer of claim 1.

* * * * *